Nov. 2, 1926.  1,605,798

M. C. VAN CROMBRUGGE

SHOCK ABSORBER

Filed Dec. 27, 1923

Inventor:
Marcel C. Van Crombrugge
By
Strickridge & Borst
Attys

Patented Nov. 2, 1926.

1,605,798

UNITED STATES PATENT OFFICE.

MARCEL CHARLES VAN CROMBRUGGE, OF GHENT, BELGIUM.

SHOCK ABSORBER.

Application filed December 27, 1923, Serial No. 682,875, and in Belgium May 3, 1923.

This invention relates to an improved shock absorber of the kind used in motorcycles, motor vehicles, railway and other vehicles such as spring shackles or fastened between the wheel axles and the frame of the vehicle or in any other convenient manner, to avoid the rebounding of the vehicle frame, as a result of the reception of severe shocks.

One object of the invention is to provide a shock absorber of the liquid-type of a compact and entirely closed construction in which the liquid and the cooperating springs are contained in a single receptacle.

A further object is to secure such a combination of a spring cushion and of a liquid brake, that the shocks will be absorbed principally by the compression of springs of variable resistance while the subsequent expansion of the said springs will be braked by a corresponding variable action of the liquid contained in the single receptacle.

With these objects in view, the invention consists in the special arrangements and combinations of parts as will be hereinafter fully described and pointed out in the appended claims.

Referring to the annexed drawings, which show as an example one embodiment of the invention:

Figure 1:
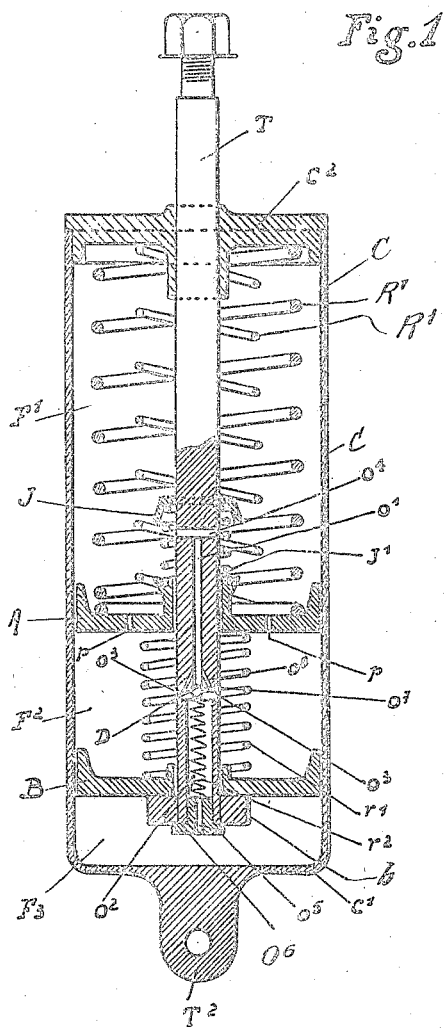
Fig. 1 is a vertical section of the shock absorber.
Figure 2:
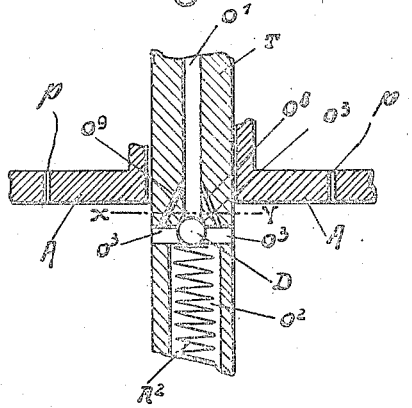
Fig. 2 is a section on an enlarged scale of the central rod of the apparatus showing the relative position of the passages provided in the said rod and of a piston which is adapted to slide along said rod, the parts being at rest.
Figure 4:
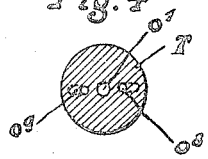

Fig. 4 gives a transverse section of the central rod, the said section being taken along the line $x$—$y$ in Fig. 2 to show the passages in the rod.

Figure 5:
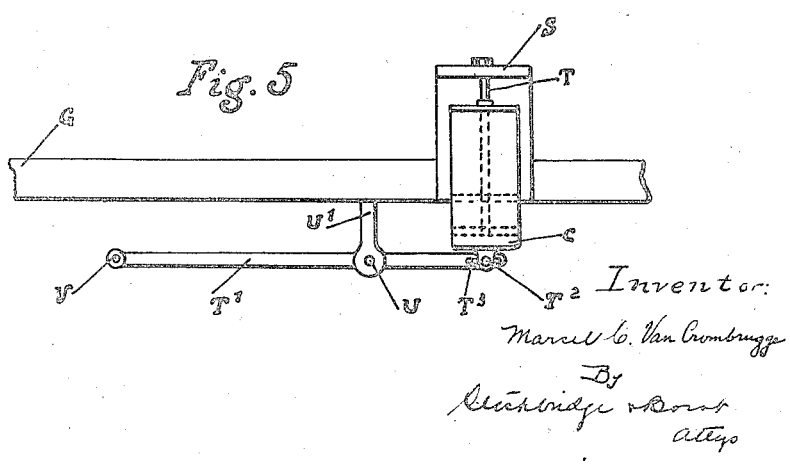

Fig. 5 shows in front elevation one manner of mounting the shock absorber on a vehicle frame.

A shock absorber constructed according to the invention comprises a cylindrical receptacle C, povided with a closed bottom $C^1$ and with a screw-cover $C^2$. A rod T is passed centrally through the cover $C^2$. A piston B is fixed at the end of this rod, for instance, by means of a nut $b$, and a second piston A is adapted to slide along the rod T within the receptacle. A spring $r^1$ is coiled around the rod T between the pistons A and B and one or more springs $R^1$ are coiled around the rod T between the piston A and the cover $C^2$. The rod T, being placed within the receptacle C forms with the pistons A and B three compartments $F^1$, $F^2$ and $F^3$ in the said receptacle.

The said compartments communicate with each other through a central passage $o^1$, $o^2$ which is bored in the rod T, the part $o^1$ of the said passage being open in the compartment $F^1$ through lateral openings $o^4$ and the part $o^2$ being open in the compartment $F^2$ through lateral openings $o^8$. The part $o^2$ of the passage is of a greater diameter than the part $o^1$ and further communicates with the compartment $F^3$ through an opening $o^5$ which is provided in a socket $o^6$ screwed or otherwise fixed in the end of the rod T to support a relatively weak coiled spring $r^2$ by aid of which a ball-valve D is maintained in contact with the conical seat $o^7$ formed at the place of junction of the parts $o^1$ and $o^5$ of the central passage. Laterally to the said seat, two inclined passages $o^8$ and $o^9$ are bored in the central rod T to secure a permanent communication between the compartment $F^2$ and the compartment $F^1$ through $o^1$ when the ball-valve D closes the communication between the part $o^1$ of the passage and the part $o^2$ above the lateral openings $o^3$.

A cap J is fixed to the rod T above the lateral openings $o^4$ to serve as a rest for a spring $J^1$ acting at its lower end on the piston A to maintain the same in a predetermined position relative to piston B and to prevent the distance between the said pistons A and B from increasing above a given limit. Finally it must be observed that the piston A is provided with small openings $p$ through which the compartments $F^1$ and $F^2$ communicate directly.

When in use, the receptacle C is filled totally or partially with a suitable liquid, for instance oil, in such a manner that the compartments $F^3$ and $F^2$ are filled up while compartment $F^1$ may be filled only partially. Spring $r^1$ is intended to absorb the small shocks while the spring or springs $R^1$ are intended to absorb the severe shocks. The liquid contained in the compartments $F^2$ and $F^3$ is intended to brake the expansion of the springs $r^1$ and $R^1$ respectively after each compression. The arrangement of the passage $o^1$—$o^2$ together with the ball valve D and the passages $o^8$ and $o^9$ is for the purpose of securing a suitable action of the spring $r^1$ on the production of small shocks, while the small openings $p$ which are provided in the piston A are for the purpose of preventing an abnormal compression of the liquid in the compartment $F^2$ on the production of very heavy or severe shocks.

Figure 3:
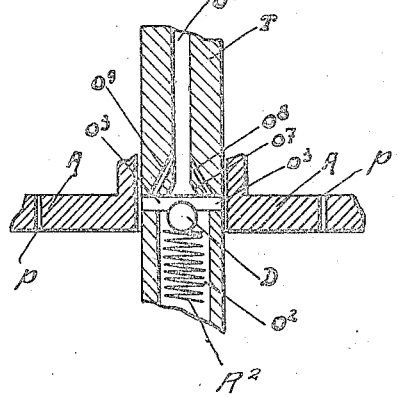
Fig. 3 is a section similar to Fig. 2 showing the cooperation of the piston with the passages provided in the central rod, on the occasion of severe shocks.

The apparatus as described may be used, for instance, as shown in Fig. 5. When applied to a vehicle frame G the rod T may be fixed to the frame, for instance, by aid of a support S, while the receptacle C is pivotally mounted in a slide $T^3$ at the end of a lever $T^1$ through a connecting lug $T^2$. The lever $T^1$, which is adapted to pivot at U on a support $U^1$ depending from the vehicle frame, is connected at its other end to the wheel axle V. As a consequence when the wheel-axle V is subjected to a shock, the receptacle C is displaced relative to the rod T in such a manner that the springs $r^1$ and $R^1$ (or the spring $r^1$ alone according to the intensity of the shock) are compressed within the receptacle between the pistons B and A and the cover $C^2$. If the shock is only a small one, it is absorbed by the spring $r^1$ only, the action of the spring not being braked during its compression by the liquid contained in the compartment $F^2$ as the said liquid then passes freely from compartment $F^2$ into compartment $F^3$ through the openings $O^3$ and part $O^2$ of the central passage of the rod T. If the shock is a relatively severe one, when the spring $r^1$ has been compressed, the openings $o^5$ are closed by the piston A (Fig. 3) in such a manner that the liquid contained in the compartment $F^2$ causes the piston A to be displaced upwardly together with the piston B relative to the receptacle C. The spring or springs $R^1$ are then compressed and absorb the shock while the liquid contained in compartment $F^1$ is caused to pass into compartment $F^3$ through the openings $O^4$, the passage $O^1$, by passing the ball-valve D which moves, and then through the passage $O^2$ and the opening $O^5$. The subsequent expansion of the spring $r^1$ takes place readily as the passage of the liquid contained in the compartment $F^3$ from the said compartment into compartment $F^2$ is not intensively braked during the downward movement of piston B on account of the large section of passage $o^2$. The expansion of the spring or springs $R^1$ (if the same have been compressed by a larger shock) on the contrary is intensively braked on account of the fact that the direct passage of the liquid from compartment $F^3$ and $F^2$ into compartment $F^1$ is prevented by the action of the ball-valve D which is pressed upon its seat in such a manner that the compensating action of the liquid can only take place through the small inclined openings $o^8$ and $o^9$ and eventually through the openings $p$ which are provided in the piston A. A very smooth action of the shock absorber is thus secured and any rebounding effect on the vehicle frame is prevented in a simple and efficient manner.

What I claim is:

1. In a shock absorber of the character described, in combination, a fluid-containing closed receptacle, a rod slidably mounted in the interior thereof and provided with a passage having spaced ports, relatively movable pistons carried by the rod and dividing the receptacle into chambers communicating with said ports, spring means of varying strength in said chambers and yieldable successively to relative movements of varying intensity of the receptacle and the rod, and yieldable means normally constricting the passage communicating with the chamber containing the strongest spring.

2. In a shock absorber of the character described, in combination, a fluid-containing closed receptacle, a rod slidably mounted in the interior thereof and provided with a passage having three spaced ports, relatively movable pistons carried by the rod and dividing the receptacle into three chambers communicating with said ports, spring means of varying strength in two adjacent chambers and yieldable successively to relative movements of varying intensity of the receptacle and the rod, and yieldable means normally constricting the passage between the chambers containing the spring means.

3. In a shock absorber of the character described, in combination, a fluid-containing closed receptacle, a rod slidably mounted in the interior thereof and provided with a passage having three spaced ports, said passage having a relatively narrow portion between two of said ports and a relatively wide portion between the middle port and the third port, relatively movable pistons carried by the rod and dividing the receptacal into three chambers communicating with said ports, spring means of varying strength in two of said chambers and yieldable successively to relative movements of varying intensity of the receptacle and the rod, and yieldable means normally constricting said narrow portion.

4. In a shock absorber of the character described, the combination of elements as set forth in claim 3, said rod being provided with auxiliary passages establishing communication between the middle port and the relatively narrow portion, and said yieldable means comprising a member in said middle port, and spring means in the relatively wide portion normally retaining said member in a position obstructing the opening to the narrow portion.

5. In a shock absorber of the character described, in combination, a fluid-containing closed receptacle, a rod slidably mounted in the interior thereof and provided with a passage having spaced ports, pistons carried by the rod and dividing the receptacle into chambers communicating with said ports, and spring means yieldably resisting relative movement of the rod and receptacle and disposed between the pistons and between one thereof and the receptacle.

6. In a shock absorber of the character described, in combination, a fluid-containing closed receptacle, a rod slidably mounted in the interior thereof and provided with a passage having three spaced ports, two pistons carried by the rod and dividing the receptacle into three chambers communicating with said ports, and spring means yieldably resisting relative movement of the rod and receptacle and comprising relatively weak spring means between the pistons and relatively strong spring means between one of the pistons and the receptacle.

7. In a shock absorber of the character described, in combination, a fluid-containing closed receptacle, a rod slidably mounted in the interior thereof and provided with a passage having three spaced ports, two pistons carried by the rod and dividing the receptacle into three chambers communicating with said ports, spring means yieldably resisting relative movement of the rod and receptacle and comprising relatively weak spring means between the pistons and relatively strong spring means between one of the pistons and the receptacle, and obstructing means movable into and out of the passage communicating with the last named chamber to allow free flow of fluid out of said chamber but constricting the return flow.

8. In a shock absorber of the character described, in combination, a fluid-containing closed receptacle, a rod slidably mounted in the interior thereof and provided with a passage having spaced ports, two spaced pistons carried by the rod and dividing the receptacle into three chambers communicating with said ports, one of said pistons being fixed with respect to the rod, the other piston being slidably mounted with respect to the rod and movable with the receptacle to cover and uncover the port leading into the chamber between the pistons, and spring means between the pistons yieldably resisting relative movement of the sliding piston toward the other.

9. In a shock absorber, the combination with the elements as set forth in claim 8, of relatively strong spring means between the sliding piston and the receptacle, said last named means being of a strength yieldably to resist relative movement of the rod and receptacle only after a predetermined stress of the spring means between the pistons.

10. In a shock absorber, the combination of elements as set forth in claim 8, said sliding piston having openings therethrough to prevent excessive fluid pressure between the pistons when the port communicating with the latter chamber is covered.

In testimony whereof I have signed my name to this specification.

MARCEL CHARLES VAN CROMBRUGGE.